(12) United States Patent
Shah et al.

(10) Patent No.: US 8,969,225 B2
(45) Date of Patent: Mar. 3, 2015

(54) INCORPORATION OF NANOPARTICLES IN COMPOSITE FIBERS

(75) Inventors: Tushar K. Shah, Columbia, MD (US); Harry C. Malecki, Abingdon, MD (US)

(73) Assignee: Applied Nano Structured Soultions, LLC, Baltimore, MD (US)

( * ) Notice: Subject to any disclaimer, the term of this patent is extended or adjusted under 35 U.S.C. 154(b) by 206 days.

(21) Appl. No.: 12/846,698

(22) Filed: Jul. 29, 2010

(65) Prior Publication Data

US 2011/0028308 A1 Feb. 3, 2011

Related U.S. Application Data

(60) Provisional application No. 61/230,993, filed on Aug. 3, 2009.

(51) Int. Cl.
*C03C 3/00* (2006.01)
*C03C 13/00* (2006.01)
(Continued)

(52) U.S. Cl.
CPC *B01J 35/06* (2013.01); *B01J 23/70* (2013.01); *B01J 23/745* (2013.01); *B01J 31/06* (2013.01); *B01J 35/0013* (2013.01); *B01J 35/006* (2013.01); *B82Y 30/00* (2013.01);
(Continued)

(58) Field of Classification Search
CPC .... B82Y 30/00; B82Y 40/00; Y10S 977/779; Y10S 977/773; Y10S 977/778; Y10S 977/776; A61K 8/0283

USPC ....... 428/34.5; 65/17.3; 501/11, 35; 264/165, 264/172.11; 977/778, 779
See application file for complete search history.

(56) References Cited

U.S. PATENT DOCUMENTS 4,300,821 A 11/1981 Mignen
4,515,107 A 5/1985 Fournier et al.
(Continued)

FOREIGN PATENT DOCUMENTS

CA 2476881 A1 9/2003
CN 1345694 4/2002
(Continued)

OTHER PUBLICATIONS

Zhang et al., "Integration and characterization of aligned carbon nanotubes on metal/silicon substrates and effects of water", Applied Surface Science 255 (2009) 5003-5008.
(Continued)

*Primary Examiner* — Matthew Matzek
(74) *Attorney, Agent, or Firm* — McDermott Will & Emery LLP (57) ABSTRACT

A method includes a providing a molten glass fiber core and disposing a plurality of nanoparticles that include a transition metal oxide on the molten glass fiber core at or above the softening temperature of the glass fiber core, thereby forming a nanoparticle-laden glass fiber. The plurality of nanoparticles are embedded at the surface of said glass fiber core. A method includes providing a mixture of molten glass and a plurality of nanoparticles. The plurality of nanoparticles include a transition metal. The method further includes forming nanoparticle-laden glass fibers, in which the plurality of nanoparticles are embedded throughout the glass fibers.

12 Claims, 2 Drawing Sheets

(51) Int. Cl.

| | | |
|---|---|---|
| *B29C 39/14* | (2006.01) | |
| *B29C 41/24* | (2006.01) | |
| *B01J 35/06* | (2006.01) | |
| *B01J 23/70* | (2006.01) | |
| *B01J 23/745* | (2006.01) | |
| *B01J 31/06* | (2006.01) | |
| *B01J 35/00* | (2006.01) | |
| *B82Y 30/00* | (2011.01) | |
| *C03B 5/173* | (2006.01) | |
| *C03B 37/023* | (2006.01) | |
| *C03B 37/10* | (2006.01) | |
| *C03C 14/00* | (2006.01) | |
| *C03C 25/10* | (2006.01) | |
| *C04B 20/10* | (2006.01) | |
| *C04B 26/10* | (2006.01) | |
| *C04B 35/628* | (2006.01) | |
| *C03B 37/02* | (2006.01) | |
| *B01J 23/38* | (2006.01) | |

(52) U.S. Cl.
CPC ............ *C03B 5/173* (2013.01); *C03B 37/023* (2013.01); *C03B 37/10* (2013.01); *C03C 14/006* (2013.01); *C03C 25/101* (2013.01); *C04B 20/1066* (2013.01); *C04B 26/10* (2013.01); *C04B 35/62847* (2013.01); *C04B 35/62873* (2013.01); *C04B 35/62876* (2013.01); *C04B 35/62892* (2013.01); *C04B 35/62894* (2013.01); *C03B 37/0206* (2013.01); *C03B 37/0213* (2013.01); *B01J 23/38* (2013.01); *C04B 2235/5248* (2013.01); *C04B 2235/5288* (2013.01); *Y10S 977/778* (2013.01); *Y10S 977/779* (2013.01)
USPC ................ 501/35; 501/11; 65/17.3; 264/165; 977/778; 977/779

(56) References Cited

U.S. PATENT DOCUMENTS

| | | | |
|---|---|---|---|
| 4,530,750 A | | 7/1985 | Alsenberg et al. |
| 4,707,349 A | | 11/1987 | Hjersted |
| 4,759,950 A | | 7/1988 | Stevens |
| 4,797,378 A | * | 1/1989 | Sowman ..................... 501/95.1 |
| 4,920,917 A | | 5/1990 | Nakatani et al. |
| 5,093,155 A | | 3/1992 | Miyazaki et al. |
| 5,130,194 A | | 7/1992 | Baker et al. |
| 5,173,367 A | | 12/1992 | Liimatta et al. |
| 5,221,605 A | | 6/1993 | Bard et al. |
| 5,225,659 A | | 7/1993 | Kusano et al. |
| 5,238,808 A | | 8/1993 | Bard et al. |
| 5,246,794 A | | 9/1993 | Blomgren et al. |
| 5,310,687 A | | 5/1994 | Bard et al. |
| 5,470,408 A | | 11/1995 | Nielson et al. |
| 5,514,217 A | | 5/1996 | Niino et al. |
| 5,547,525 A | | 8/1996 | Bennett et al. |
| 5,571,749 A | | 11/1996 | Matsuda et al. |
| 5,589,007 A | | 12/1996 | Fujioka et al. |
| 5,595,750 A | | 1/1997 | Jacobson et al. |
| 5,639,984 A | | 6/1997 | Nielson |
| 5,714,089 A | | 2/1998 | Bard et al. |
| 5,731,147 A | | 3/1998 | Bard et al. |
| 5,764,004 A | | 6/1998 | Rabinowitz |
| 5,780,101 A | | 7/1998 | Nolan et al. |
| 5,908,585 A | | 6/1999 | Shibuta |
| 5,968,274 A | | 10/1999 | Fujioka et al. |
| 5,997,832 A | | 12/1999 | Lieber et al. |
| 6,072,930 A | | 6/2000 | Kornreich et al. |
| 6,140,138 A | | 10/2000 | Bard et al. |
| 6,146,462 A | | 11/2000 | Yializis et al. |
| 6,146,642 A | | 11/2000 | Garcia-Sastre et al. |
| 6,184,280 B1 | | 2/2001 | Shibuta |

| | | | |
|---|---|---|---|
| 6,221,154 B1 | | 4/2001 | Lee et al. |
| 6,232,706 B1 | | 5/2001 | Dai et al. |
| 6,251,520 B1 | | 6/2001 | Blizzard et al. |
| 6,270,897 B1 | | 8/2001 | Flautt et al. |
| 6,331,209 B1 | | 12/2001 | Jang et al. |
| 6,333,016 B1 | | 12/2001 | Resasco et al. |
| 6,346,189 B1 | | 2/2002 | Dai et al. |
| 6,361,861 B2 | | 3/2002 | Gao |
| 6,413,487 B1 | | 7/2002 | Resasco et al. |
| 6,420,293 B1 | | 7/2002 | Chang et al. |
| 6,440,277 B1 | | 8/2002 | D'Amato |
| 6,455,021 B1 | | 9/2002 | Saito |
| 6,465,057 B1 | | 10/2002 | Nakahigashi et al. |
| 6,479,028 B1 | | 11/2002 | Kaner et al. |
| 6,491,789 B2 | | 12/2002 | Niu |
| 6,495,258 B1 | | 12/2002 | Chen et al. |
| 6,528,572 B1 | | 3/2003 | Patel et al. |
| 6,564,744 B2 | | 5/2003 | Nakahigashi et al. |
| 6,653,619 B2 | | 11/2003 | Chin et al. |
| 6,673,392 B2 | | 1/2004 | Lee et al. |
| 6,692,717 B1 | | 2/2004 | Smalley et al. |
| 6,765,949 B2 | | 7/2004 | Chang |
| 6,790,425 B1 | | 9/2004 | Smalley et al. |
| 6,818,821 B2 | | 11/2004 | Fujieda et al. |
| 6,837,928 B1 | | 1/2005 | Zhang et al. |
| 6,852,410 B2 | | 2/2005 | Veedu et al. |
| 6,863,942 B2 | | 3/2005 | Ren et al. |
| 6,887,451 B2 | | 5/2005 | Dodelet et al. |
| 6,900,264 B2 | | 5/2005 | Kumar et al. |
| 6,900,580 B2 | | 5/2005 | Dai et al. |
| 6,908,572 B1 | | 6/2005 | Derbyshire et al. |
| 6,913,075 B1 | | 7/2005 | Knowless et al. |
| 6,934,600 B2 | | 8/2005 | Jang et al. |
| 6,936,653 B2 | | 8/2005 | McElrath et al. |
| 6,955,800 B2 | | 10/2005 | Resasco et al. |
| 6,962,892 B2 | | 11/2005 | Resasco et al. |
| 6,967,013 B2 | | 11/2005 | Someya et al. |
| 6,979,709 B2 | | 12/2005 | Smalley et al. |
| 6,986,853 B2 | | 1/2006 | Glatkowski et al. |
| 6,986,877 B2 | | 1/2006 | Takikawa et al. |
| 6,994,907 B2 | | 2/2006 | Resasco et al. |
| 7,011,760 B2 | | 3/2006 | Wang et al. |
| 7,018,600 B2 | | 3/2006 | Yanagisawa et al. |
| 7,022,776 B2 | | 4/2006 | Bastiaens et al. |
| 7,045,108 B2 | | 5/2006 | Jiang et al. |
| 7,056,452 B2 | | 6/2006 | Niu et al. |
| 7,074,294 B2 | | 7/2006 | Dubrow |
| 7,094,386 B2 | | 8/2006 | Resasco et al. |
| 7,105,596 B2 | | 9/2006 | Smalley et al. |
| 7,108,841 B2 | | 9/2006 | Smalley et al. |
| 7,118,693 B2 | | 10/2006 | Glatkowski et al. |
| 7,125,533 B2 | | 10/2006 | Khabasheku et al. |
| 7,125,534 B1 | | 10/2006 | Smalley et al. |
| 7,132,621 B2 | | 11/2006 | Kumar et al. |
| 7,144,563 B2 | | 12/2006 | Rao et al. |
| 7,148,619 B2 | | 12/2006 | Den et al. |
| 7,151,129 B2 | | 12/2006 | Ishikawa et al. |
| 7,153,452 B2 | | 12/2006 | Ogale et al. |
| 7,157,068 B2 | | 1/2007 | Li et al. |
| 7,160,531 B1 | | 1/2007 | Jacques et al. |
| 7,160,532 B2 | | 1/2007 | Liu et al. |
| 7,211,320 B1 | | 5/2007 | Cooper et al. |
| 7,226,643 B2 | | 6/2007 | Juang et al. |
| 7,235,159 B2 | | 6/2007 | Gu et al. |
| 7,239,073 B2 | | 7/2007 | Takikawa et al. |
| 7,253,442 B2 | | 8/2007 | Huang et al. |
| 7,261,779 B2 | | 8/2007 | Gardner |
| 7,265,174 B2 | | 9/2007 | Carroll et al. |
| 7,265,175 B2 | | 9/2007 | Winey et al. |
| 7,278,324 B2 | | 10/2007 | Smits et al. |
| 7,294,302 B2 | | 11/2007 | Koide et al. |
| 7,329,698 B2 | | 2/2008 | Noguchi et al. |
| 7,338,684 B1 | | 3/2008 | Curliss et al. |
| 7,354,881 B2 | | 4/2008 | Resasco et al. |
| 7,354,988 B2 | | 4/2008 | Charati et al. |
| 7,372,880 B2 | | 5/2008 | Jablonski et al. |
| 7,384,663 B2 | | 6/2008 | Oiry et al. |
| 7,399,794 B2 | | 7/2008 | Harmon et al. |
| 7,407,640 B2 | | 8/2008 | Barrera et al. |

(56) References Cited

U.S. PATENT DOCUMENTS

| | | |
|---|---|---|
| 7,407,901 B2 | 8/2008 | Bystricky et al. |
| 7,410,628 B2 | 8/2008 | Bening et al. |
| 7,419,601 B2 | 9/2008 | Cooper et al. |
| 7,431,965 B2 | 10/2008 | Grigorian et al. |
| 7,445,817 B2 | 11/2008 | Kumar et al. |
| 7,448,441 B2 | 11/2008 | Hendricks et al. |
| 7,448,931 B2 | 11/2008 | Liu et al. |
| 7,459,627 B2 | 12/2008 | Lee et al. |
| 7,465,605 B2 | 12/2008 | Raravikar et al. |
| 7,473,466 B1 | 1/2009 | Muradov |
| 7,479,052 B2 | 1/2009 | Kim et al. |
| 7,488,455 B2 | 2/2009 | Dai et al. |
| 7,494,639 B2 | 2/2009 | Wang et al. |
| 7,510,695 B2 | 3/2009 | Smalley et al. |
| 7,534,486 B2 | 5/2009 | Boerstoel et al. |
| 7,563,411 B2 | 7/2009 | Jiang et al. |
| 7,563,428 B2 | 7/2009 | Resasco et al. |
| 7,569,425 B2 | 8/2009 | Huang et al. |
| 7,588,700 B2 | 9/2009 | Kwon et al. |
| 7,592,248 B2 | 9/2009 | Ventzek et al. |
| 7,597,869 B2 | 10/2009 | Hsiao |
| 7,608,798 B2 | 10/2009 | Kumar et al. |
| 7,611,579 B2 | 11/2009 | Lashmore et al. |
| 7,615,204 B2 | 11/2009 | Ajayan et al. |
| 7,615,205 B2 | 11/2009 | Jiang et al. |
| 7,632,550 B2 | 12/2009 | Mizuno et al. |
| 7,632,569 B2 | 12/2009 | Smalley et al. |
| 7,656,027 B2 | 2/2010 | Dangelo et al. |
| 7,666,915 B2 | 2/2010 | Zhang et al. |
| 7,687,981 B2 | 3/2010 | Parsapour |
| 7,700,943 B2 | 4/2010 | Raravikar et al. |
| 7,709,087 B2 | 5/2010 | Majidi et al. |
| 7,718,220 B2 | 5/2010 | D'Silva et al. |
| 7,771,798 B1 | 8/2010 | Grosse et al. |
| 7,776,777 B2 | 8/2010 | Kim et al. |
| 7,811,632 B2 | 10/2010 | Eres |
| 7,815,820 B2 | 10/2010 | Tan et al. |
| 7,816,709 B2 | 10/2010 | Balzano et al. |
| 7,862,795 B2 | 1/2011 | Zhang et al. |
| 7,867,468 B1 | 1/2011 | Haddon et al. |
| 7,871,591 B2 | 1/2011 | Harutyunyan et al. |
| 7,880,376 B2 | 2/2011 | Takai et al. |
| 7,927,701 B2 | 4/2011 | Curliss et al. |
| 8,148,276 B2 | 4/2012 | Nejhad et al. |
| 8,168,291 B2 | 5/2012 | Shah et al. |
| 2002/0035170 A1 | 3/2002 | Glatkowski et al. |
| 2002/0085968 A1 | 7/2002 | Smalley et al. |
| 2002/0102201 A1 | 8/2002 | Colbert et al. |
| 2002/0197474 A1 | 12/2002 | Reynolds |
| 2003/0042147 A1 | 3/2003 | Talin et al. |
| 2003/0068432 A1 | 4/2003 | Dai et al. |
| 2003/0102585 A1 | 6/2003 | Poulin et al. |
| 2003/0111333 A1 | 6/2003 | Montgomery et al. |
| 2003/0157378 A1 | 8/2003 | Mizuno et al. |
| 2003/0175003 A1 | 9/2003 | Gasca et al. |
| 2004/0007955 A1 | 1/2004 | Yaniv et al. |
| 2004/0026234 A1 | 2/2004 | Vandern Brande et al. |
| 2004/0079278 A1 | 4/2004 | Kamins et al. |
| 2004/0082247 A1 | 4/2004 | Desai et al. |
| 2004/0089237 A1 | 5/2004 | Pruett et al. |
| 2004/0105807 A1 | 6/2004 | Fan et al. |
| 2004/0194707 A1 | 10/2004 | Takahashi et al. |
| 2004/0245088 A1 | 12/2004 | Gardner |
| 2004/0247808 A1 | 12/2004 | Cooper et al. |
| 2004/0253167 A1 | 12/2004 | Silva et al. |
| 2005/0009694 A1 | 1/2005 | Watts et al. |
| 2005/0026778 A1* | 2/2005 | Axtell et al. ............. 502/417 |
| 2005/0090176 A1 | 4/2005 | Dean et al. |
| 2005/0093458 A1 | 5/2005 | Babayan et al. |
| 2005/0100501 A1 | 5/2005 | Veedu et al. |
| 2005/0112052 A1 | 5/2005 | Gu et al. |
| 2005/0119105 A1* | 6/2005 | Zimmer et al. ............. 501/32 |
| 2005/0119371 A1 | 6/2005 | Drzal et al. |
| 2005/0147553 A1 | 7/2005 | Wong et al. |
| 2005/0170089 A1 | 8/2005 | Lashmore et al. |
| 2005/0172370 A1 | 8/2005 | Haq et al. |
| 2005/0176329 A1 | 8/2005 | Olry et al. |
| 2005/0188727 A1 | 9/2005 | Greywall |
| 2005/0191490 A1 | 9/2005 | Ton-That et al. |
| 2005/0238566 A1 | 10/2005 | Rao et al. |
| 2005/0245622 A1 | 11/2005 | Beijense et al. |
| 2005/0260412 A1 | 11/2005 | Gardner |
| 2005/0263456 A1 | 12/2005 | Cooper et al. |
| 2005/0287064 A1 | 12/2005 | Mayne et al. |
| 2006/0002844 A1 | 1/2006 | Suenaga et al. |
| 2006/0052509 A1 | 3/2006 | Saitoh |
| 2006/0062944 A1 | 3/2006 | Gardner et al. |
| 2006/0067871 A1 | 3/2006 | Hart et al. |
| 2006/0083674 A1 | 4/2006 | Maruyama et al. |
| 2006/0083927 A1 | 4/2006 | Von Ehr |
| 2006/0104890 A1 | 5/2006 | Harutyunyan et al. |
| 2006/0108906 A1 | 5/2006 | Gosain et al. |
| 2006/0110599 A1 | 5/2006 | Honma et al. |
| 2006/0121275 A1 | 6/2006 | Poulin et al. |
| 2006/0159916 A1 | 7/2006 | Dubrow et al. |
| 2006/0165914 A1 | 7/2006 | Abrahamson |
| 2006/0166003 A1 | 7/2006 | Khabashesku et al. |
| 2006/0172179 A1 | 8/2006 | Gu et al. |
| 2006/0177602 A1 | 8/2006 | Dijon et al. |
| 2006/0198956 A1 | 9/2006 | Eres |
| 2006/0205304 A1 | 9/2006 | Marzolin et al. |
| 2007/0009421 A1 | 1/2007 | Kittrell et al. |
| 2007/0020167 A1 | 1/2007 | Han et al. |
| 2007/0035226 A1 | 2/2007 | Ganapathiraman et al. |
| 2007/0048521 A1 | 3/2007 | Istvan |
| 2007/0053824 A1 | 3/2007 | Subramanya et al. |
| 2007/0054105 A1 | 3/2007 | Hsiao |
| 2007/0090489 A1 | 4/2007 | Hart et al. |
| 2007/0092431 A1 | 4/2007 | Resasco et al. |
| 2007/0099527 A1 | 5/2007 | Brun et al. |
| 2007/0103048 A1 | 5/2007 | Liu et al. |
| 2007/0110977 A1 | 5/2007 | Al-Haik et al. |
| 2007/0128960 A1 | 6/2007 | Ghasemi Jejhad et al. |
| 2007/0135588 A1 | 6/2007 | Diakoumakos et al. |
| 2007/0141114 A1 | 6/2007 | Muisener et al. |
| 2007/0148340 A1 | 6/2007 | Kalkanoglu et al. |
| 2007/0148429 A1 | 6/2007 | McGrath et al. |
| 2007/0183959 A1 | 8/2007 | Charlier et al. |
| 2007/0189953 A1 | 8/2007 | Bai et al. |
| 2007/0205394 A1 | 9/2007 | Furman et al. |
| 2007/0253890 A1 | 11/2007 | Nakayama et al. |
| 2007/0259128 A1 | 11/2007 | Parsapour |
| 2007/0298669 A1 | 12/2007 | Barrera et al. |
| 2008/0014431 A1 | 1/2008 | Lashmore et al. |
| 2008/0017845 A1 | 1/2008 | Drndic et al. |
| 2008/0020193 A1 | 1/2008 | Jang et al. |
| 2008/0023396 A1 | 1/2008 | Fugetsu |
| 2008/0048364 A1 | 2/2008 | Armeniades et al. |
| 2008/0053922 A1 | 3/2008 | Honsinger, Jr. et al. |
| 2008/0069760 A1 | 3/2008 | O'Brien et al. |
| 2008/0075954 A1 | 3/2008 | Wardle et al. |
| 2008/0118753 A1 | 5/2008 | Poulin et al. |
| 2008/0135815 A1 | 6/2008 | Glatkowski et al. |
| 2008/0160286 A1 | 7/2008 | Asrar et al. |
| 2008/0160302 A1 | 7/2008 | Asrar et al. |
| 2008/0164801 A1 | 7/2008 | Min et al. |
| 2008/0170982 A1 | 7/2008 | Zhang et al. |
| 2008/0181839 A1 | 7/2008 | Arendt et al. |
| 2008/0182108 A1 | 7/2008 | Curliss et al. |
| 2008/0187648 A1 | 8/2008 | Hart et al. |
| 2008/0213498 A1 | 9/2008 | Drzal et al. |
| 2008/0247938 A1 | 10/2008 | Tsai et al. |
| 2008/0247939 A1 | 10/2008 | Iyuke |
| 2008/0274036 A1 | 11/2008 | Resasco et al. |
| 2008/0279753 A1 | 11/2008 | Harutyunyan |
| 2008/0280031 A1 | 11/2008 | Drzal et al. |
| 2008/0280136 A1 | 11/2008 | Zacharaih |
| 2008/0286564 A1 | 11/2008 | Tsotsis |
| 2008/0287598 A1 | 11/2008 | Lee |
| 2008/0290787 A1 | 11/2008 | Cok |
| 2008/0305329 A1* | 12/2008 | D'Silva et al. ............. 428/372 |
| 2008/0308209 A1 | 12/2008 | Loutfy et al. |
| 2009/0017301 A1 | 1/2009 | Moireau |
| 2009/0020734 A1 | 1/2009 | Jang et al. |

(56) References Cited

U.S. PATENT DOCUMENTS

| | | |
|---|---|---|
| 2009/0021136 A1 | 1/2009 | Coll et al. |
| 2009/0047453 A1 | 2/2009 | Folaron et al. |
| 2009/0047502 A1 | 2/2009 | Folaron et al. |
| 2009/0068387 A1 | 3/2009 | Panzer et al. |
| 2009/0068461 A1 | 3/2009 | Reneker et al. |
| 2009/0081441 A1 | 3/2009 | Shah et al. |
| 2009/0092832 A1 | 4/2009 | Moireau |
| 2009/0099016 A1 | 4/2009 | Carruthers et al. |
| 2009/0116798 A1* | 5/2009 | Blanchandin et al. ........ 385/123 |
| 2009/0121219 A1 | 5/2009 | Song et al. |
| 2009/0126783 A1 | 5/2009 | Lin et al. |
| 2009/0136707 A1 | 5/2009 | Ueno |
| 2009/0140098 A1 | 6/2009 | Lengsfeld et al. |
| 2009/0176100 A1 | 7/2009 | Higashi et al. |
| 2009/0176112 A1 | 7/2009 | Kruckenberg et al. |
| 2009/0186214 A1 | 7/2009 | Lafdi et al. |
| 2009/0191352 A1 | 7/2009 | DuFaux et al. |
| 2009/0192241 A1 | 7/2009 | Raravikar et al. |
| 2009/0202422 A1 | 8/2009 | Kajiura et al. |
| 2009/0212430 A1 | 8/2009 | Wyland |
| 2009/0214800 A1 | 8/2009 | Saito |
| 2009/0220409 A1 | 9/2009 | Curliss et al. |
| 2009/0258164 A1 | 10/2009 | Nakai et al. |
| 2009/0286079 A1 | 11/2009 | Barket et al. |
| 2009/0294753 A1 | 12/2009 | Hauge et al. |
| 2009/0311166 A1 | 12/2009 | Hart et al. |
| 2009/0311168 A1 | 12/2009 | Duvall |
| 2009/0318614 A1 | 12/2009 | Chevalier |
| 2009/0325377 A1 | 12/2009 | DiJon et al. |
| 2010/0000770 A1 | 1/2010 | Gupta et al. |
| 2010/0059243 A1 | 3/2010 | Chang |
| 2010/0074834 A1 | 3/2010 | Kim |
| 2010/0092841 A1 | 4/2010 | Lopez et al. |
| 2010/0098931 A1 | 4/2010 | Daniel et al. |
| 2010/0099319 A1 | 4/2010 | Lashmore et al. |
| 2010/0117764 A1 | 5/2010 | Wang et al. |
| 2010/0159240 A1 | 6/2010 | Shah et al. |
| 2010/0178825 A1 | 7/2010 | Shah et al. |
| 2010/0188833 A1 | 7/2010 | Liang et al. |
| 2010/0192851 A1 | 8/2010 | Shah et al. |
| 2010/0196697 A1 | 8/2010 | D'Silva et al. |
| 2010/0197848 A1 | 8/2010 | Verghese et al. |
| 2010/0200208 A1 | 8/2010 | Cola et al. |
| 2010/0206504 A1 | 8/2010 | Akiyama et al. |
| 2010/0210159 A1 | 8/2010 | Zhu |
| 2010/0221424 A1 | 9/2010 | Malecki et al. |
| 2010/0224129 A1 | 9/2010 | Malecki et al. |
| 2010/0227134 A1 | 9/2010 | Shah et al. |
| 2010/0254885 A1 | 10/2010 | Menchhofer et al. |
| 2010/0260931 A1 | 10/2010 | Malecki et al. |
| 2010/0260933 A1 | 10/2010 | Malecki et al. |
| 2010/0260998 A1 | 10/2010 | Waicukauski et al. |
| 2010/0261058 A1 | 10/2010 | Lopatin et al. |
| 2010/0272891 A1 | 10/2010 | Malecki et al. |
| 2010/0276072 A1 | 11/2010 | Shah et al. |
| 2010/0279569 A1 | 11/2010 | Shah et al. |
| 2010/0311866 A1 | 12/2010 | Huang et al. |
| 2011/0014446 A1 | 1/2011 | Saito |
| 2011/0024409 A1 | 2/2011 | Shah et al. |
| 2011/0024694 A1 | 2/2011 | Shah |
| 2011/0132245 A1 | 6/2011 | Shah et al. |
| 2011/0186775 A1 | 8/2011 | Shah et al. |
| 2011/0203927 A1 | 8/2011 | Draper et al. |
| 2011/0241244 A1 | 10/2011 | Liu |
| 2011/0256336 A1 | 10/2011 | Koike |
| 2012/0065300 A1 | 3/2012 | Shah et al. |
| 2012/0070667 A1 | 3/2012 | Malet et al. |
| 2012/0122020 A1 | 5/2012 | Hata et al. |
| 2012/0247800 A1 | 10/2012 | Shah et al. |
| 2012/0251432 A1 | 10/2012 | Cooper et al. |

FOREIGN PATENT DOCUMENTS

| | | |
|---|---|---|
| CN | 1379740 A | 11/2002 |
| CN | 1418260 A | 5/2003 |
| CN | 1477260 A | 2/2004 |
| CN | 1502553 A | 6/2004 |
| CN | 1504407 A | 6/2004 |
| CN | 1558441 A | 12/2004 |
| CN | 1696337 A | 11/2005 |
| CN | 1826286 A | 8/2006 |
| CN | 1919727 A | 2/2007 |
| CN | 101012621 A | 8/2007 |
| CN | 101049927 | 10/2007 |
| CN | 101070250 A | 11/2007 |
| CN | 101095230 A | 12/2007 |
| CN | 101173386 A | 5/2008 |
| CN | 101177803 | 5/2008 |
| CN | 101177803 | 5/2008 |
| CN | 101365830 A | 2/2009 |
| CN | 101372327 A | 2/2009 |
| CN | 101372329 | 2/2009 |
| CN | 101378988 | 3/2009 |
| CN | 101541860 A | 9/2009 |
| CN | 101698975 | 4/2010 |
| CN | 101746717 A | 6/2010 |
| EP | 0098315 A1 | 1/1984 |
| EP | 1637828 A2 | 3/2006 |
| EP | 1939149 A2 | 7/2008 |
| GB | 2399092 A | 9/2004 |
| GB | 2458776 | 10/2009 |
| IN | 01900DE2008 A | 3/2010 |
| JP | 60-027700 | 2/1985 |
| JP | 01-283376 A | 11/1989 |
| JP | H04-334823 A | 11/1992 |
| JP | 08-192044 A | 7/1996 |
| JP | 09-012343 | 1/1997 |
| JP | H11-139815 A | 5/1999 |
| JP | 2000-309870 A | 11/2000 |
| JP | 2002-115071 A | 4/2002 |
| JP | 2003-502507 A | 1/2003 |
| JP | 2003-171108 A | 6/2003 |
| JP | 2003-239171 A | 8/2003 |
| JP | 2004-002182 A | 1/2004 |
| JP | 2004-015600 A | 1/2004 |
| JP | 2004-059428 A | 2/2004 |
| JP | 2004-284919 A | 10/2004 |
| JP | 2004-327085 A | 11/2004 |
| JP | 2005-162571 A | 6/2005 |
| JP | 2005-213700 | 8/2005 |
| JP | 2006-026533 A | 2/2006 |
| JP | 2006-057231 A | 3/2006 |
| JP | 2006-069816 A | 3/2006 |
| JP | 2006-255817 A | 9/2006 |
| JP | 2006-342011 | 12/2006 |
| JP | 2007-091556 A | 4/2007 |
| JP | 2007-117881 A | 5/2007 |
| JP | 2007-523033 A | 8/2007 |
| JP | 2007-523822 A | 8/2007 |
| JP | 2007-524774 A | 8/2007 |
| JP | 2008-063196 A | 3/2008 |
| JP | 2008-063718 A | 3/2008 |
| JP | 2008-535752 A | 9/2008 |
| JP | 2008-535763 A | 9/2008 |
| JP | 2008-266057 A | 11/2008 |
| JP | 2008-296338 A | 12/2008 |
| JP | 2009-021038 A | 1/2009 |
| JP | 2009-517531 A | 4/2009 |
| JP | 2009-535530 A | 10/2009 |
| JP | 2009-537439 A | 10/2009 |
| JP | 2011-071049 A | 4/2011 |
| KR | 100829001 | 5/2008 |
| TW | 200833861 | 8/2008 |
| TW | 201217827 A | 5/2012 |
| WO | WO-99/58756 | 11/1999 |
| WO | WO 01-39970 | 6/2001 |
| WO | WO 03/082733 | 10/2003 |
| WO | WO-2004/071654 A1 | 8/2004 |
| WO | WO-2005/007564 A1 | 1/2005 |
| WO | WO-2005/012171 A2 | 2/2005 |

(56) References Cited

FOREIGN PATENT DOCUMENTS

| | | | |
|---|---|---|---|
| WO | WO-2005/028174 A2 | 3/2005 | |
| WO | WO-2005037470 A2 | 4/2005 | |
| WO | WO-2005/044723 A2 | 5/2005 | |
| WO | WO-2005075341 A2 | 8/2005 | |
| WO | WO 2006-048531 | 5/2006 | |
| WO | WO-2006/064760 A1 | 6/2006 | |
| WO | WO 2006/107144 | 10/2006 | |
| WO | WO 2006-115486 | 11/2006 | |
| WO | WO 2007-015710 | 2/2007 | |
| WO | WO 2007020362 A2 * | 2/2007 | H01S 3/067 |
| WO | WO 2007-061854 | 5/2007 | |
| WO | WO 2007-089118 | 8/2007 | |
| WO | WO 2007-130979 | 11/2007 | |
| WO | WO-2007/136755 A2 | 11/2007 | |
| WO | WO-2007136613 A2 | 11/2007 | |
| WO | WO 2007-149109 | 12/2007 | |
| WO | WO-2008/025750 A1 | 3/2008 | |
| WO | WO 2008-041183 | 4/2008 | |
| WO | WO 2008-054541 | 5/2008 | |
| WO | WO 2008-085634 | 7/2008 | |
| WO | WO-2008/106143 A2 | 9/2008 | |
| WO | WO 2008-115640 | 9/2008 | |
| WO | WO 2008/153609 | 12/2008 | |
| WO | WO 2009-004346 | 1/2009 | |
| WO | WO-2009/008291 A1 | 1/2009 | |
| WO | WO-2009/027133 A2 | 3/2009 | |
| WO | WO 2009-110885 | 9/2009 | |
| WO | WO-2010/007163 A1 | 1/2010 | |
| WO | WO 2010-087903 | 8/2010 | |
| WO | WO-2010/129234 A2 | 11/2010 | |

OTHER PUBLICATIONS

Zhong, et al., "Growth Kinetics of 0.5cm Vertically Aligned Single-Walled Carbon Nanotubes", The Journal of Physical Chemistry B (Letters), Feb. 6, 2007, pp. 1907-1910, vol. 111, No. 8.

"Conformal coating", The Free Dictionary by Farlex, last viewed Jan. 15, 2013, retrieved from <http://encyclopedia.thefreedictionary.com/conformal+coating>.

Mayya, et al., "Diameter Controlled Synthesis of Carbon Nanotubes by CVD Using Steric-Stabilized Nanoparticle Catalysts", NSTI-Nanotech, 2006, vol. 1, pp. 98-101.

Definition of nanoparticle provided by Dictionary.com, accessed Nov. 2, 2012, retrieved from <http://dictionary.reference.com/browse/nanoparticle>.

Qu, et al., "Carbon Microfibers Sheathed with Aligned Carbon Nanotubes: Towards Multidimensional Multicomponent and Multifunctional Nanomaterials," SMALL, 2006, pp. 1052-1059, vol. 2, No. 8-9.

Medalia, et al., "Redox Recipes. I. Reaction between Ferrous Iron and Peroxides. General Considerations," Journal of Polymer Science, 1949, pp. 377-398, vol. IV.

Yamamoto, et al., "High-yield growth and morphology control of aligned carbon nanotubes on ceramic fibers for multifunctional enhancement of structural composites," Carbon, Mar. 2009, vol. 47, No. 3, pp. 551-560.

Ci, et al., "Direct growth of carbon nanotubes on the surface of ceramic fibers," Carbon, Jan. 2005, vol. 43, No. 4, pp. 883-886.

Emmenegger, et al., "Carbon Nanotube Synthesized on Metallic Substrate," Applied Surface Science, 2000, pp. 452-456.

Hart, et al., "Desktop Growth of Carbon-Nanotube Monoliths with in Situ Optical Imaging," Small, 2007, pp. 772-777, vol. 3, No. 5.

Hasegawa, et al., "Millimeter-Tall Single-Walled Carbon Nanotubes Rapidly Grown with and without Water," ACS Nano, 2011, pp. 975-984, vol. 5, No. 2.

Ago, et al., "Colloidal Solution of Metal Nanoparticles as a Catalyst for Carbon Nanotube Growth", Proceedings Materials Research Society, Fall 2000, pp. A13.18.1-A13.18.5, vol. 633, Materials Research Society.

Bradford, et al., "Electrical Conductivity Study of Carbon nanotube Yarns, 3-D Hybrid Braids and their Composites", Jouranl of Composite Materials, pp. 1533-1545, vol. 42, No. 15, SAGE Productions, Los Angeles, London, New Delhi and Singapore, Aug. 2008.

Bubert, et al., "Basic analytical investigation of plasma-chemically modified carbon fibers", Spectrochimica Acta Part B., 2002, pp. 1601-1610, vol. 57, Elsevier Science B.V.

Chae, et al., "A comparison of reinforcement efficiency of various types of carbon nanotubes in polyacrylonitrile fiber", Polymer, Nov. 21, 2005, pp. 10925-10935, vol. 46, No. 24, Elsevier Ltd.

Che, et al., "Chemical Vapor Deposition Based Synthesis of Carbon Nanotubes and Nanofibers Using a Template Method", Chem. Mater., 1998, pp. 260-267, vol. 10, American Chemical Society.

Chen, et al., "Basalt fiber-epoxy laminates with functionalized multi-walled carbon nanotubes", Composites, Part A, 2009, pp. 1082-1089, vol. 40, Elsevier Ltd.

Chen, et al., "Pulsed electrodeposition of Pt nanoclusters on carbon nanotubes modified carbon materials using diffusion restricting viscous electroyles", Electrochemistry Communications, Jun. 2007, pp. 1348-1354, vol. 9, Elsevier B.V.

Ci, et al., "Direct Growth of Carbon Nanotubes on the Surface of Ceramic Fibers", Carbon, 2005, pp. 883-886, vol. 43, No. 4, Elsevier Ltd.

Franz, et al., "Carbon Single-Wall Nanotube Growth in a Volumetrically Confined Arc Discharge System", U.S. Departement of Energy Journal of Undergraduate Research, pp. 66-69, publication date unknown.

Garcia, et al., "Aligned Carbon Nanotube Reinforcement of Advanced Composite Ply Interfaces," 49th AIAA/ASCE/AHS/ASC Structures, Structural Dynamics, and Materials Conference, Apr. 7-10, 2008, Schaumburg, IL, MIT, American Institute of Aeronautics and Astronautics, Inc.

Hsu, et al., "Optical Absorption and Thermal Transport of Individual Suspended Carbon Nanotube Bundles", Nano Lett, 2009, pp. 590-594, vol. 9, No. 2, American Chemical Society, Publication Date (Web): Jan. 13, 2009.

Jiang, et al., "Carbon nanotube-coated solid-phase microextraction metal fiber based on sol-gel technique", Journal of Chromatography A., May 29, 2009, pp. 4641-4647, vol. 1216, Elsevier B.V.

Jiang, et al., "Plasma-Enhanced Deposition of Silver Nanoparticles onto Polymer and Metal Surfaces for the Generation of Antimicrobial Characteristics", Journal of Applied_Polymer Science, 2004, pp. 1411-1422, vol. 93, Wiley Periodicals, Inc.

Jung, et al., "Fabrication of radar absorbing structure (RAS) using GFR-nano composite and spring-back compensation of hybrid composite RAS shells", Composite Structures, 2006, pp. 571-576, vol. 75, Elsevier Ltd.

Kim, et al., "Processing, characterization, and modeling of carbon nanotube-reinforced multiscale composites," Composites Science and Technology, 2009, pp. 335,342, vol. 69, Elsevier Ltd.

Kind, et al., "Patterned Films of Nanotubes Using Microcontact Printing of Catalysts", Adv. Mater., 1999, pp. 1285-1289, vol. 11, No. 15, Wiley-VCH Verlag GmbH, D-69469 Weinheim.

Kramer, et al., Constrained Iron Catalysts for Single-Walled Carbon Nanotube Growth?, Langmuir 2005, 21, 8466-8470 [http://pubs.acs.org/dol.abs/10.1021/1a0506729].

Laachachi, et al., "A chemical method to graft carbon nanotubes onto a carbon fiber", Materials Letters, 2008, pp. 394-397, vol. 62, Elsevier B.V.

Lee, "Syntheses and properties of fluorinated carbon materials", Journal of Fluorine Chemistry, 2007, pp. 392-403, vol. 128, Elsevier B.V.

Lee, et al., "Fabrication and design of multi-layered radar absorbing structures of MWNT-filled glass/epoxy plain-weave composites", Composite Structures, 2006, pp. 397-405, vol. 76, Elsevier Ltd.

Li, et al., "A Miniature glucose/$O_2$ biofuel cell with single-walled carbon nanotubes-modified carbon fiber microelectrodes as the substrate", Electrochemistry Communications, Jun. 2008, pp. 851-854, vol. 10, Elsevier B.V.

Li, et al., "Electromagnetic Interference (EMI) Shielding of Single-Walled Carbon Nanotube Epoxy Composites", Nano Lett., 2006, pp. 1141-1145, vol. 6, No. 6, American Chemical Society.

Lux, Rudolf, "PCT Application No. PCT/US2007/086875 Search Report and Written Opinion", May 13, 2008.

(56) References Cited

OTHER PUBLICATIONS

Makris, et al., "Carbon Nanotubes Growth and Anchorage to Carbon Fibres", Carbon Nanotubes, 2006, pp. 57-58, vol. 222, Springer, the Netherlands.
Meyyappan, et al., "Carbon nanotube growth by PECVD: a review", Plasma Sources Sci. Technol., 2003, pp. 205-216, vol. 12, IOP Publishing Ltd, UK.
Mylvaganam, "Fabrication and Application of Polymer Composites Comprising Carbon Nanotubes", Recent Pat Nanotechnol., 2007, pp. 59-65, vol. 1, Bentham Science Publishers, Ltd.
Panhuis, et al., "Carbon Nanotube Mediated Reduction in Optical Activity in Polyaniline Composite Materials", J. Phys. Chem. C, 2008, pp. 1441-1445, vol. 112, American Chemical Society.
PISCO, et al., "Hollow fibers integrated with single walled carbon nanotubes: Bandgap modification and chemical sensing capability", Sensors and Actuators B, 2008, pp. 163-170, vol. 129, Elsevier B.V.
Račkauskas "Carbon nanotube growth and use in energy sector", Energetika, 2006, pp. 43-46, vol. 2.
Satishkumar, et al., "Bundles of aligned carbon nanotubes obtained by the pyrolysis of ferrocene-hydrocarbon mixtures: role of the metal nanoparticles produced in situ", Chemical Physics Letters, 1999, pp. 158-162, vol. 307, Elsevier Science B.V.
Suh, et al., "Highly ordered two-dimensional carbon nanotube arrays", Applied Physics Letters, Oct. 4, 2002, pp. 2047-2049, vol. 75, No. 14, American Institute of Physics.
Thostenson, et al., "Carbon nanotube/carbon fiber hybrid multiscale composites", J. Appl. Phys., 2002, pp. 6034-6037, vol. 91, No. 9, American Institute of Physics.
U.S. Appl. No. 12/766,817, filed Apr. 23, 2010.
U.S. Appl. No. 61/295,621, filed Jan. 15, 2010.
U.S. Appl. No. 61/297,704, filed Jan. 22, 2010.
Wang, et al., "Penetration depth of atmospheric pressure plasma surface modification into multiple layers of polyester fabrics", Surface and Coatings Technology, 2007, pp. 77-83, vol. 202, Elsevier B.V.
Wang, et al., "Processing and property investigation of single-walled carbon nanotube (SWNT) buckypaper/epoxy resin matrix nanocomposites", Composites, Part A, 2004, pp. 1225-1232, vol. 35, Elsevier Ltd.
Wichmann, et al., "Glass-fibre-reinforced composites with enhanced mechanical and electrical properties—Benefits and limitations of a nanoparticle modified matrix", Engineering Fracture Mechanics, 2006, pp. 2346-2359, vol. 73, Elisevier Ltd.
Xu, et al., "Bone-Shaped Nanomaterials for Nanocomposite Applications", Nano Lett., 2003, pp. 1135-1139, vol. 3, No. 8, American Chemical Society.
Yabe, et al., Synthesis of well-aligned carbon nanotubes by radio frequency plasma enhanced CVD method, Diamond and Related Materials, 2004, pp. 1292-1295, vol. 13, Elsevier B.V.
Yanagishita, et al., "Carbon Nanotubes with A Triangular Cross-section, Fabricated Using Anodic Porous Alumina as the Temple", Adv. Mater., 204, pp. 429-432, vol. 16, No. 5, Wiley-VCH Verlag GmbH & Co. KGaA, Weinheim., Mar. 2004.
Yang et al., "Electrical Conductivity and Electromagnetic Interference Shielding of Multi-walled Carbon Nanotube Filled Polymer Composites" Mater. Res. Soc. Symp. Proc., 2005, pp. HH5.3.1-HH.5.3.5, vol. 858E, Materials Research Society.
Yeh, et al., "Mechanical properties of phenolic-based nanocomposites reinforced by multi-walled carbon nanotubes and carbon fibers", Composites: Part A, 2008, pp. 677-684, vol. 39, No. 4.
Zhang, et al., "In situ growth of carbon nanotubes on inorganic fibers with different surface properties," Materials Chemistry and Physics, 2008, pp. 317-321, vol. 107, Science Direct.
Zhao, et al., "Growth of carbon nanotubes on the surface of carbon fibers", Carbon, 2007, pp. 380-383, vol. 46, No. 2, Elsevier Ltd.
Zhao, et al., "The growth of multi-walled carbon nanotubes with different morphologies on carbon fibers", Carbon, 2005, pp. 651-673, vol. 43, Elsevier Ltd.
Zhu, et al., "Carbon nanotube growth on carbon fibers", Diamond and Related Materials, 2003, pp. 1825-1825, vol. 12, Elsevier B.V.
Zhu, et al., "Synthesis of single-walled carbon nanotubes by the vertical floating catalyst method," Chinese Science Bulletin, 2002, pp. 159-162, vol. 47, No. 2.
Hart, et al., "Growth of conformal single-walled carbon nanotube films from MO/Fe/AL$_2$O$_3$ deposited by electron beam evaporation," Carbon (2006) vol. 44, pp. 348-359.
Keyvani, "Huge Opportunities for Industry of Nanofibrous Concrete Technology," International Journal of Nanoscience and Nonotechnology, Dec. 2007, pp. 3-11, vol. 3, No. 1.
Callender, et al., "Aqueous Synthesis of Water-Soluble Alumoxanes: Environmentally Benign Precursors to Alumina and Aluminum-Based Ceramics," Chem. Mater. 1997, pp. 2418-2433, vol. 9.
Hou, et al., "Carbon nanotubes formed on carbonized electrospun polymer nanofibers," Polymer Preprints, 2003, pp. 63-64, vol. 44, No. 2.

\* cited by examiner

INCORPORATION OF NANOPARTICLES IN COMPOSITE FIBERS

CROSS-REFERENCE TO RELATED APPLICATIONS

This application claims the benefit of priority to U.S. Provisional Application Ser. No. 61/230,993, filed Aug. 3, 2009, the entire contents of which are incorporated herein by this reference.

STATEMENT REGARDING FEDERALLY SPONSORED RESEARCH OR DEVELOPMENT

Not applicable.

BACKGROUND AND FIELD OF THE INVENTION

The present invention generally relates to fibers, more specifically to modified glass fibers that streamline processing steps for incorporation into composite materials.

Many composite materials include micro-scale fibers as reinforcing elements in a binding matrix. Multiscale composites have been prepared which incorporate carbon nanotubes (CNTs) in these traditional composite materials. One method for incorporation of CNTs into the composite involves doping the matrix with CNTs. However, there are limitations in the amount of CNTs which can be added to the matrix due to viscosity increases. Moreover, such methods often do not control CNT alignment which further prevents the multiscale composite from realizing the full potential of CNT incorporation.

Another method for incorporation of CNTs into a multiscale composite involves applying CNTs onto the fiber surface, by either direct or indirect synthesis, prior to introducing the fibers into the matrix. This can be achieved by either placing a catalyst material on the fiber surface and growing CNTs from the deposited catalyst, or using a floating catalyst to both synthesize and deposit CNTs on the fiber surface. Both methods result in improved alignment of CNTs, while increasing the overall amount of CNTs in the final composite. However, additional process steps are used to improve interfacial properties between CNTs and catalyst particles with the fiber surface. Without these steps, poor adhesion between these interfaces can result in lower than expected performance.

A method that reduces the overall complexity of the growth process as well as improves the interfacial properties of CNT-Catalyst-Surface would be beneficial. The present invention satisfies these needs and provides related advantages as well.

SUMMARY OF THE INVENTION

The present invention provides compositions that incorporate CNT growth catalyst particles in fibers at the fiber manufacturing level resulting in a reduction of process steps when growing the CNTs and incorporating the functionalized fibers into composite matrices. In some embodiments the catalyst is disposed throughout the fiber, including a portion exposed at the fiber surface. In some embodiments, the catalyst is exposed at the fiber surface and is present to a certain depth around a core portion of the fiber. In such embodiments, the core itself is substantially devoid of catalyst particles. The present invention also provides methods for making the fibers that incorporate CNT growth catalyst particles.

In some aspects, embodiments disclosed herein relate to a method that includes providing a molten glass fiber core and disposing a plurality of nanoparticles that include a transition metal oxide on the molten glass fiber core at or above the softening temperature of the glass fiber core. The method provides a nanoparticle-laden glass fiber, in which the plurality of nanoparticles are embedded at the surface of the glass fiber core.

In some aspects, embodiments disclosed herein relate to a method that includes providing a mixture of molten glass and a plurality of nanoparticles. The nanoparticles include a transition metal. The method further includes forming nanoparticle-laden glass fibers, in which the plurality of nanoparticles are embedded throughout the glass fibers.

Methods of the invention can be employed to manufacture various articles including, CNT-infused fibers, chopped strand mats incorporating nanoparticles, which can serve for downstream CNT synthesis, and higher order composite materials that include the nanoparticles and/or CNTs grown from these nanoparticles.

BRIEF DESCRIPTION OF THE DRAWINGS

In the following description, reference is made to the accompanying Figure that forms a part thereof, and in which are shown by way of illustration specific embodiments in which the invention may be practiced. It is to be understood that other embodiments may be utilized and changes may be made without departing from the scope of the present invention.

DETAILED DESCRIPTION OF THE INVENTION

The present invention is directed, in part, to methods that facilitate carbon nanotube (CNT) growth on glass fiber substrates by embedding CNT growth catalyst nanoparticles (CNT NPs) during the fiber manufacturing process. The resultant CNTs are well anchored to the glass fibers via mechanically and/or chemically locked CNT NPs, enhancing the interfacial properties of the CNTs with the fiber to which they are attached. In accordance with current manufacturing methods known in the art, two methods are typically used to improve the overall interfacial properties of CNTs to glass fiber substrates. One method involves etching the fiber surface to promote mechanical interlocking of catalyst particles with the surface. Etching can be achieved by either wet chemical or plasma (ion) based processes. While the result of etching is similar to the present invention, the degree of mechanical interlocking can be less effective than an embedded catalyst of the present invention, which is in better continuous conformal contact with the fiber as a result of being incorporated during fiber manufacture. Furthermore, etching processes inherently add surface roughness that provides crack initiation sites on the fiber surface. Consequently, etching can degrade the fiber material.

Another method in the art employed for improving particle to fiber substrate adhesion is chemical functionalization. This involves introducing chemically active sites on the fiber that can bond with both the fiber and the CNT NPs surface. These chemical bonds provide a path for mechanical load transfer.

Functionalization is also a product of wet chemical and plasma (ion) based properties, although various functional groups are added or created by doping solutions or plasma streams with particular species. Functionalization is a technique in which some chemical moieties can be introduced without causing damage to the fiber surface. Functionalization methods that promote adhesion between a metal and an organic surface are particularly beneficial, albeit currently few in number. Examples of functionalization that promote fiber metal adhesion include, amine, carboxyl, carbonyl, hydroxyl, fluorine, nitrates, phosphates, sulfates, and silanes. Chemical functionalization can lead to inconsistencies in functional group distribution on fiber surfaces. Methods of the present invention obviate the need for functionalization chemistry, thus avoiding any surface inconsistencies.

The present invention overcomes the aforementioned shortcomings by incorporating CNT NPs in glass fibers at the fiber manufacturing level. The methods reduce process steps and cost in the generation of CNT-infused fibers and their subsequent incorporation in composite materials. Embedding of CNT NPs in the fiber improves the effective load transfer between the CNT NPs and the fiber surface. When CNT NPs are incorporated during the fiber manufacturing process, this CNT NPs are embedded along the entire fiber surface, providing a uniform coating of nanoparticles and consequently uniform CNT growth. These embedded CNT NPs provide more efficient means of transferring load since the CNT NPs are integrated directly into the glass fiber surface. The overall process for synthesizing the CNTs on a glass fiber surface is also simplified by incorporating CNT growth catalysts at the fiber manufacturing level. Moreover, efficient coverage of individual filaments can be achieved more readily when manufacturing glass rovings as compared to applying CNT NPs to a tightly packed pre-fabricated roving.

Figure 1:
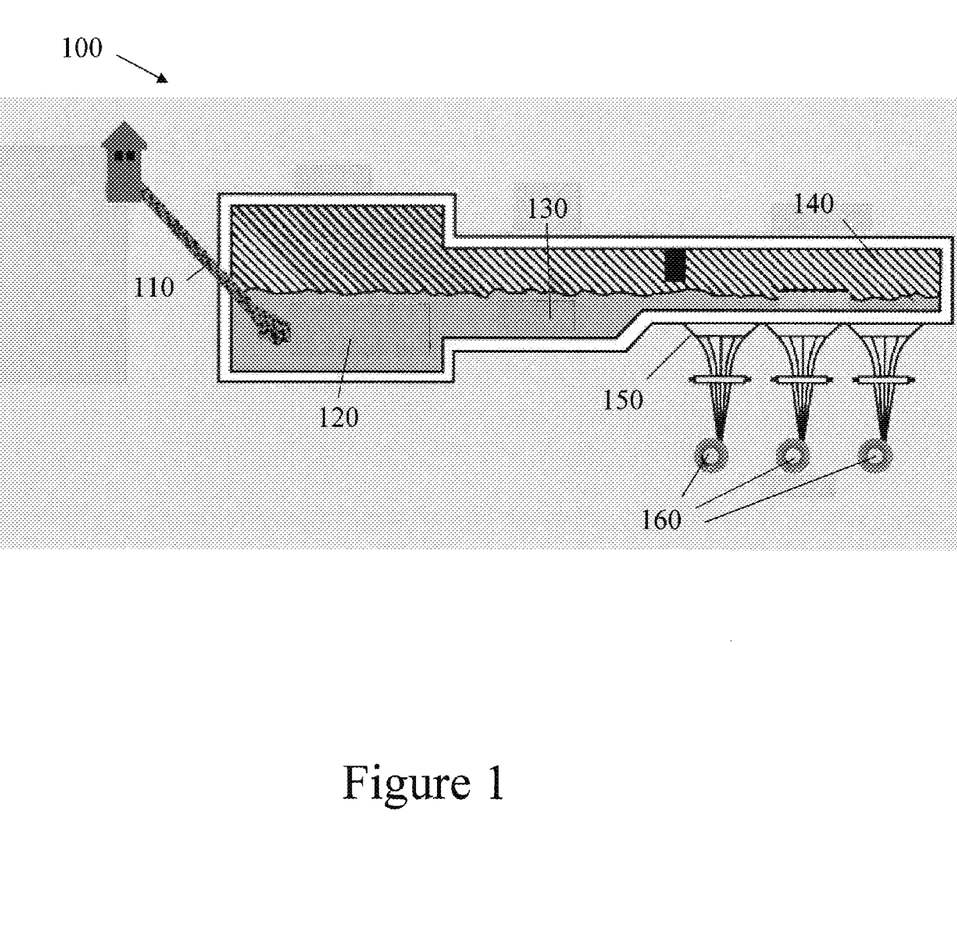
FIG. 1 shows an apparatus for drawing glass fibers.
Figure 2:
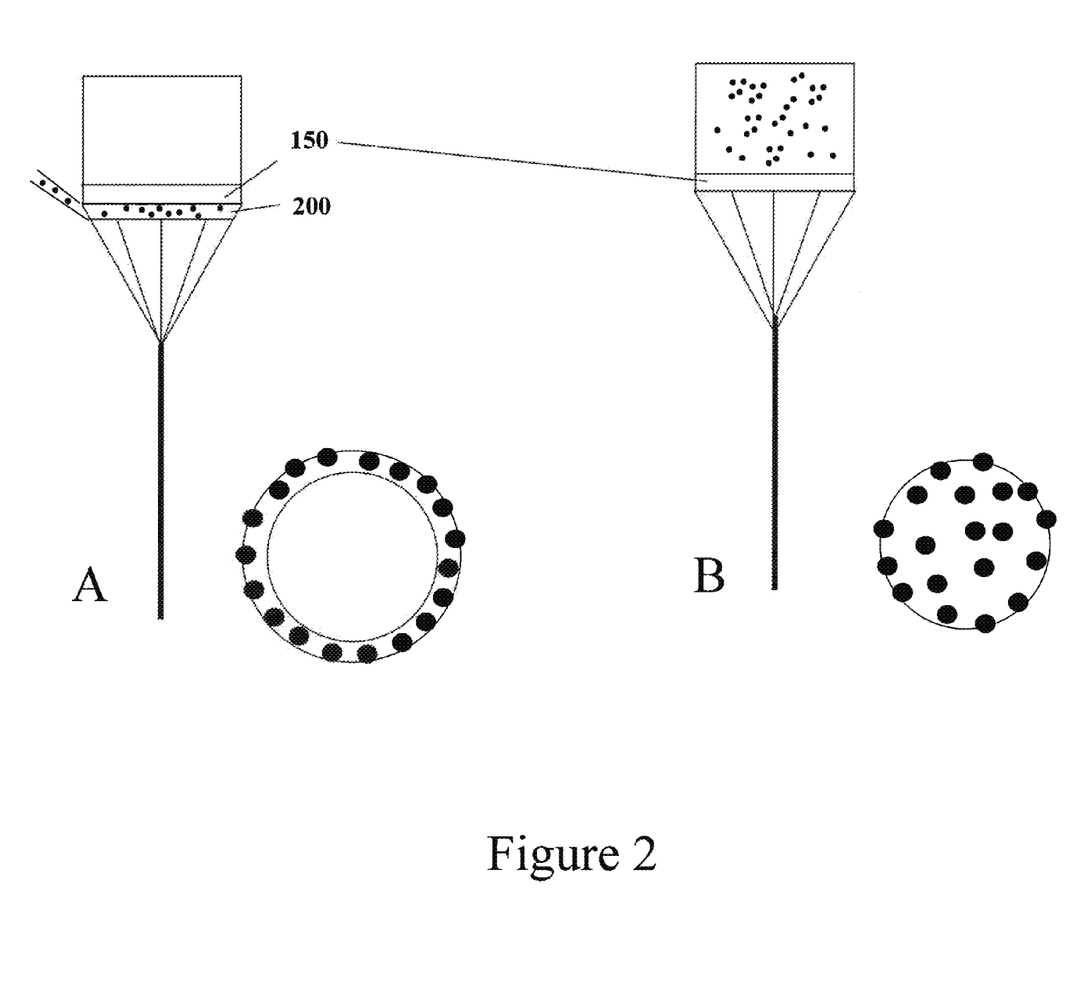
FIG. 2A shows molten glass with catalyst particles placed on the surface of a molten glass core. Catalyst particles are exposed at the fiber surface.
FIG. 2B shows molten glass with catalyst particles throughout the entire structure of glass fiber, including a portion of the catalyst exposed at the fiber surface.

The CNT NPs can be added to the glass fiber at the site of a bushing exit, as indicated in FIG. 2A, in a glass fiber making apparatus (exemplified in FIG. 1). As commonly practiced in the art, fibers exiting a bushing can be rapidly cooled using water jets. In some embodiments, the CNT NPs can be included in the cooling water and applied to the fiber as part of the cooling process. In other embodiments, the CNT NPs can be disposed on the fibers immediately prior to subjecting the nascent fibers to the water cooling jets. One skilled in the art will recognize that rapid cooling of the newly formed fibers aids in maintaining an amorphous glass structure. Therefore, when applying CNT NPs just prior to exposure to the water cooling jets, the distance from the bushing exit to the CNT NP deposition to the water cooling jets can be quite small.

Alternatively, CNT NPs can be added to a molten glass mixture as the fibers are formed through the bushing. In some such embodiments, the CNT NPs can be added to the molten glass just prior to passing through the bushing in the forehearth, as described further below and shown in FIGS. 1 and 2B. By adding the nanoparticles to the molten mixture as the fibers are pulled, the CNT NPs are prevalent on the fiber surface, although some CNT NPs can be present throughout the entire glass fiber structure. In order to protect the integrity of the CNT NPs, in some embodiments they are coated with a protective layer of alumina or other porous ceramic coating. When employing such coatings reagent access to the CNT NPs in downstream CNT growth should be accommodated.

Regardless of whether the CNT NPs are introduced before or after the bushing, the CNT NPs embedded on the surface of the fiber can be mechanically infused to the surface. In some embodiments, the embedded CNT NPs can also be chemically bonded to the fiber as well. Such bonding can include silicon oxygen metal bridging bonds when employing CNT NPs in oxide form. Through mechanical and/or chemical infusion the nanoparticles can remain anchored to the glass fiber during CNT growth and consequentially can provide an effective transfer of mechanical properties from the CNTs to the fiber.

Finally, although embodiments disclosed herein are made with reference to glass fibers, given the teachings and guidance provided herein, one skilled in the art will recognize the ability to apply these teachings to other fiber types including carbon, ceramic, metal, and organic fibers. In the case of polyacrylonitrile (PAN) carbon fibers, for example, the CNT NPs can be incorporated throughout the polyacrylonitrile fibers during their synthesis. When the graphitization process is used to convert the PAN to carbon fibers, the CNT NPs are "artifacts" that remain. Consequently, the CNT NPs are mechanically interlocked in the carbon fiber surface which can improve the interfacial properties between the CNT and the carbon fiber surface in a manner similar to that described for glass fiber substrates.

As used herein, the term "molten" refers to a state in which a glass material can be deformed and/or the surface is malleable. The temperature in the molten state can be above the softening point, for example. The "softening point" is used in a manner consistent with its use in the art to describe the equivalent of a melting point for an amorphous glass structure.

As used herein, the term "transition metal" refers to any element or alloy of elements in the d-block of the periodic table. The term "transition metal" can also include lanthanide and actinide elements in the f-block as well.

As used herein, the term "transition metal oxide" refers to any element or alloy of elements in the d-block of the periodic table in any oxide form. For example, iron oxide can be iron (II) or iron (III) oxide. The term "transition metal oxide" can also include oxide forms of the lanthanide and actinide elements in the f-block.

As used herein, the term "nanoparticle" or NP (plural NPs), or grammatical equivalents thereof refers to particles sized between about 0.1 to about 100 nanometers in equivalent spherical diameter, although the NPs need not be spherical in shape. Transition metal NPs, in particular, serve as catalysts for further CNT growth on the glass fiber materials.

As used herein, the term "embedded," when used in reference to NPs on glass fiber refers to the placement of NPs at least partially within the glass fiber structure. It also includes NPs that are fully contained within the glass fiber structure. NPs embedded in glass fibers have improved conformal contact with the glass fiber compared to NPs deposited on a roughened glass surface, such as might be obtained by plasma roughening.

As used herein, the term "sizing," or "sizing agent," or "fiber sizing agent," refers collectively to materials used in the manufacture of glass fibers as a coating to protect the integrity of glass fibers, provide enhanced interfacial interactions between a glass fiber and a matrix material in a composite, and/or alter and/or enhance particular physical properties of a glass fiber. In some embodiments, CNTs infused to glass fiber materials behave as a sizing agent.

As used herein, the term "carbon nanotube" (CNT, plural CNTs) refers to any of a number of cylindrically-shaped allotropes of carbon of the fullerene family including single-walled carbon nanotubes (SWNTs), double-walled carbon nanotubes (DWNTS), multi-walled carbon nanotubes (MWNTs). CNTs can be capped by a fullerene-like structure or open-ended. CNTs include those that encapsulate other materials.

As used herein, the term "composite" refers to a composition combining a matrix material and a reinforcing phase. As used herein, the term "matrix material" refers to a bulk material than can serve to organize the reinforcing phase, i.e. the NP embedded glass fiber materials or downstream modifications thereof, in particular orientations, including random orientation. The matrix material can benefit from the presence of the glass fiber material by imparting some aspects of the physical and/or chemical properties of the glass fiber material to the matrix material.

In some embodiments, the present invention is directed to a method that includes forming a molten glass fiber core and disposing a plurality of nanoparticles that include a transition metal oxide about the molten glass fiber core at or above the softening temperature, thereby forming a nanoparticle-laden glass fiber. The nanoparticle-laden glass fiber has the plurality of nanoparticles embedded on its surface.

Referring now to FIG. 1, there is shown a furnace apparatus 100 for the manufacture of glass fibers. Raw materials 110 are fed into furnace apparatus 100 which includes a three-sectioned chamber housing a main melting furnace section 120, a refining section 130, and forehearth 140. Glass fiber is made by blending raw materials 110, melting them in this three-stage furnace, extruding the molten glass through bushings 150 in the bottom of forehearth 140, cooling the filaments, and then applying a chemical size to prevent abrasion and other damage to the fibers. The filaments then are gathered and wound into a package on winders 160.

In some embodiments, raw materials 110 for glass fiber formation can be melted in melting furnace section 120 between about 1400° C. and 1700° C. One skilled in the art will recognize that this range of temperatures is exemplary and that glasses can be employed that melt at lower temperatures and at higher temperatures. Examples of low melting glasses include low end glasses such as E-glass. Examples of high melting glasses include high end glasses, such as S-glass. One skilled in the art will recognize that while reference is made to "melting" of glass, amorphous glass forms due not have true melting points, but rather softening points. Thus, a glass has no abrupt phase change at any specific temperature, but instead exhibits a gradual change in viscoelastic properties over a range of temperatures. In some embodiments, methods of the invention employ molten glass such as E-glass which is commonly used in glass fiber formation. In some embodiments, the molten glass can include other glass types known in the art such as A-glass, D-glass, and C-glass. The glass-type used for the molten glass can be selected from E-glass, A-glass, E-CR-glass, C-glass, D-glass, R-glass, and S-glass. E-glass includes alumino-borosilicate glass with less than 1% by weight alkali oxides and is mainly used for glass-reinforced plastics. A-glass includes alkali-lime glass with little or no boron oxide. E-CR-glass includes alumino-lime silicate with less than 1% by weight alkali oxides and has high acid resistance. C-glass includes alkali-lime glass with high boron oxide content and is used, for example, for glass staple fibers. D-glass includes borosilicate glass and possesses a high dielectric constant. R-glass includes alumino silicate glass without MgO and CaO and possesses high mechanical strength. S-glass includes alumino silicate glass without CaO but with high MgO content and possesses high tensile strength. One or more of these glass types can be processed into glass fiber materials. The type of glass employed in current fiber manufacture is mainly E-glass, although there are manufactured fibers based on A-glass, E-CR-glass, C-glass, D-glass, R-glass, and S-glass.

Referring back to FIG. 1, the melting furnace section 120 receives raw materials 110 which are a mixture of glass components. Melting occurs in this first section and uniformity is increased, including removal of bubbles. The molten glass then flows into refiner 130, where its temperature is reduced. Finally the molten glass is delivered to forehearth 140, beneath which is located a series of bushings 150 that are used to extrude the molten glass into fibers.

Glass fiber formation can include a combination of extrusion and attenuation. In extrusion, the molten glass passes out of forehearth 140 through bushing 150 made of an erosion-resistant platinum/rhodium alloy with very fine orifices which can number from between about 200 to about 8,000. Bushing 150 is heated electronically, and its temperature can be precisely controlled to maintain a constant glass viscosity. Water jets can be employed to cool the filaments as they exit bushing 150. Attenuation is the process of mechanically drawing the extruded streams of molten glass into filaments, with a diameter ranging from between about 4 µm to about 35 µm. Winders 160 can catch the molten streams and, because winders 160 revolve at a circumferential speed faster than the molten glass exiting bushing 150, tension can be applied, drawing them into thin filaments.

In some embodiments, the plurality of nanoparticles that include a transition metal can be disposed on the surface of a newly formed molten glass core as it exits bushing 150. Thus, the plurality nanoparticles can be applied to the nascent glass fibers during the drawing and winding process. As indicated in FIG. 2A, bushing 150 can be equipped with an attachment 200 to deliver the plurality of nanoparticles to the newly formed molten glass core. In some embodiments, attachment 200 is configured to apply the plurality of nanoparticles just prior to the rapid cooling by water jets that are typically employed in the art. The glass fiber at this stage can be in a sufficiently softened and/or malleable state to allow the nanoparticles to embed themselves in the surface of the glass fibers. In some embodiments, attachment 200 can be operably linked with a heating element to maintain an elevated temperature in this region during nanoparticle application.

In the configuration of FIG. 2A, delivery of the transition metal nanoparticles can be in a carrier gas or liquid. In some embodiments, a carrier can include a secondary molten glass having nanoparticles disposed throughout. This secondary molten glass can be disposed on the surface of the nascent fibers and, optionally, the newly coated fiber passed through a further bushing. In some embodiments, the secondary molten glass can be the same composition as the glass core. In other embodiments, the secondary molten glass can be different. In some embodiments, the softening temperature of the secondary molten glass can be less than the initial glass core to preserve the integrity of the transition metal nanoparticles. In some such embodiments, the temperature difference can be sufficiently small to preserve the structural integrity of the fiber itself.

In some embodiments, the nanoparticles can be applied via a carrier gas by an entrainment type mechanism. Exemplary carrier gases can include inert gases such as nitrogen, argon, helium, or the like. Nanoparticles can be prepared in situ and delivered at the exit site of bushing 150 by evaporative and/or condensation-type methods in a subatmospheric inert-gas environment. Various aerosol processing techniques can be employed to prepare nanoparticles, including, but are not limited to, combustion flame, plasma, laser ablation, chemical vapor condensation, spray pyrolysis, electrospray, and plasma spray.

In still further embodiments, the nanoparticles can be delivered to the glass fibers as part of the cooling water system. When applied in this manner, the nanoparticles are simply suspended in the cooling water solution. No changes to the existing fiber manufacturing equipment is necessary. In such embodiments, the nanoparticle can benefit from the immediate cooling conditions to reduce and/or prevent nanoparticle agglomeration. Moreover, the rapidly cooling glass is capable of effectively locking in the nanoparticle with a high degree of conformal contact between the fiber and the nanoparticle by mechanical bonding.

In some embodiments, the nanoparticle-laden glass fiber can be immediately passed through a sizing station after applying the nanoparticles simultaneously with the cooling water. Further curing of the size can provide additional chemical bonding between the nanoparticle and the glass, and the nanoparticle and the sizing material, depending on the exact nature of the nanoparticle. For example, when employing transition metal oxide nanoparticles, the oxygen atoms of the oxide can provide a bridge with the glass surface by reaction with and removal of surface hydroxyl groups of the silica; such reaction results in the formation of bridging transition metal-oxygen-silicon bonding motif. These bonds can be established at the nanoparticle deposition stage and/or during any curing of any applied sizing. Moreover, transition metal oxides can also react with the size itself to provide chemical linkage to the size material.

Regardless of the exact means by which the nanoparticles are applied, the nanoparticles are capable of embedding in the glass fiber with continual conformal contact and no additional roughening/etching of the glass fiber is needed. The result is a nanoparticle-laden catalyst with improved structural integrity.

In some embodiments, the present invention provides a method that includes providing a mixture of molten glass and a plurality of nanoparticles and forming glass fibers from this mixture, as indicated in FIG. 2B. The plurality of nanoparticles include a transition metal. In some embodiments, such transition metals are those suitable for subsequent CNT growth. After drawing the fibers, the plurality of nanoparticles are embedded throughout the glass fibers, as indicated in the cross-sectional view in FIG. 2B. In some embodiments, the nanoparticles are distributed in the molten glass in the forehearth just before passing through bushing 150 (see also FIG. 1).

One skilled in the art will recognize that the choice of transition metal and molten glass type should be selected to avoid agglomeration of transition metal nanoparticles. Transition metal nanoparticles exhibit melting point depressions that are linked to nanoparticle diameter and, in some cases, the observed melting point can be hundreds of degrees lower than the bulk metal. The melting point for a chosen transition metal nanoparticle size can be readily measured experimentally by either estimating the melting point using a transmission electron microscope (TEM) electron beam of known intensity or through nanocalorimetry, the latter technique typically being more successful for a narrow range of nanoparticle size distribution. For CNT synthesis, the size of the transition metal nanoparticle relates to the diameter and nature of the CNTs grown from the catalyst. For example, a typical catalyst for multi-walled CNT synthesis can be in a range from between about 5 nm to about 50 nm.

In some embodiments, when employing transition metal nanoparticles in molten glass, it can be beneficial to coat the particle with a thermally insulating coating. Such coatings can include, for example, porous alumina or other porous ceramic material, such as silicon carbide. These coatings can impart sufficient short term protection to the transition metal nanoparticles to prevent agglomeration. Coated metal nanoparticles can be manufactured according to procedures known in the art including, for example, atomic layer deposition (ALD). In some embodiments, the protective coating about the transition metal nanoparticles can integrate with the molten glass structure. For example, oxygen atoms of an alumina network can integrate into the molten glass network of silicon-oxygen atoms. The use of porous materials to protect against nanoparticle agglomeration can also allow downstream access of reagents for CNT synthesis.

Referring again to FIG. 1, methods of the present invention can introduce the plurality of nanoparticles in any of the sections of the furnace, including initial melting portion 120, refiner 130, or the forehearth 140. When a particle has a sufficient protective coating, it can be introduced earlier in the process. In some embodiments, when no insulative coating is provided, it can be beneficial to introduce the nanoparticles into the molten glass just before passing through the pores of bushing 150. In still further embodiments, bushing 150 is equipped with pores having a delivery device to apply nanoparticles to the glass fiber as it is passing through the pores.

In some embodiments, transition metal nanoparticle loading can be in a range from between about 0.001 to about 3 percent by linear weight when applied as part of the molten glass mixture in the forehearth. The nanoparticles can include a transition metal selected from zero valent metals, metal oxides, metal nitrides, and the like of d-block and f-block transition metals. When mixed in molten glass the transition metal nanoparticles can range in from between about 0.1 nm to about 80 nm.

Methods of the invention employing nanoparticles introduced at the site of bushing 150 and mixed with the molten glass in forehearth 140 can operate at a temperature for glass fiber formation in a range from between about 200° C. to about 1700° C., inclusive.

Regardless of whether the nanoparticles are introduced before or after bushing 150, the nanoparticles employed in the present invention can be any transition metal, or alloy, nanoparticle of any d-block or f-block transition metal as described above, including the actinides and lanthanides. In addition, the nanoparticles can include alloys and non-alloy mixtures of d-block and/or f-block metals in elemental form or in salt form, and mixtures thereof. Such salt forms include, without limitation, oxides, carbides, and nitrides. Non-limiting exemplary transition metal nanoparticles include Ni, Fe, Co, Mo, Cu, Pt, Au, and Ag and salts thereof and mixtures thereof. Many of transition metal catalysts are readily commercially available from a variety of suppliers, including, for example, Ferrotec Corporation (Bedford, N.H.). In some embodiments, the catalyst can be iron oxide and/or oxides of nickel, cobalt, or copper. The oxide forms benefit from the aforementioned chemical bonding motifs described herein above.

In some embodiments, the nanoparticle loading is in a range from between about 0.01 to about 5 percent by weight, when employed in the molten glass, as described above. When applied to the surface at the pore exit from bushing 150, the nanoparticle loading can be in a range from between about 0.001 to about 3 percent by linear weight.

In some embodiments, the nanoparticles range in size from between about 0.1 nm to about 80 nm, including, for example, 0.1, 1, 2, 3, 4, 5, 6, 7, 8, 9, 10, 15, 20, 25, 30, 35, 40, 45, 50, 55, 60, 65, 70, 75, and 80 nm, including any value in between and fractions thereof. In some embodiments the nanoparticles range in size from between about 5 nm to about 30 nm, including 5, 6, 7, 8, 9, 10, 11, 12, 13, 14, 15, 16, 17, 18, 19, 20, 21, 22, 23, 24, 25, 26, 27, 28, 29, and 30 nm, or any fraction thereof. The choice of particle size, or distribution of sizes can be selected to target a particular type of CNT synthesis. For example, in some embodiments, nanoparticles between 5 nm and 30 nm can be used for the preparation of multi-walled carbon nanotubes (MWNTs). Nanoparticles less than 1 nm can be used for the preparation of single-walled carbon nanotubes (SWNTs).

Nanoparticles can be applied as solutions for application to the nascent glass fiber material. Common solvents allow the nanoparticles to be uniformly dispersed throughout. Such solvents can include, without limitation, water, acetone, hexane, isopropyl alcohol, toluene, ethanol, methanol, tetrahydrofuran (THF), cyclohexane or any other solvent with controlled polarity to create an appropriate dispersion of the nanoparticles. Concentrations of the nanoparticles can be in a range from about 1:1 to 1:10000 nanoparticle to solvent. In some embodiments, the solvent is water and the catalyst solution is employed as the cooling solution as described above.

In some embodiments, after applying the nanoparticles to the glass fiber material, the glass fiber material can be further heated near the softening temperature. This can aid in embedding the nanoparticles in the surface of the glass fiber material and can encourage further chemical bonding between the glass fiber surface and the nanoparticle. In some embodiments heating of the glass fiber material after disposing the catalyst on the glass fiber material can be at a temperature that is between about 500° C. and 1000° C. In some such embodiments, the temperature employed can be a function of the glass type in use. Heating near the softening temperature can be performed prior to or substantially simultaneously with introduction of a carbon feedstock to facilitate CNT growth.

In some embodiments, methods of the invention provide nanoparticle laden glass fibers having a diameter in a range from between about 4 microns to about 50 microns, and in other embodiments from between about 4 microns to about 35 microns. The diameter can be determined, in part, by size of the pores on bushing 150. The diameter can also be controlled, in part, by the speed of winders 160. One skilled in the art will recognize the ability to manufacture any diameter glass fiber including, for example, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35 micron fibers and so on up to about 50 micron fibers, including any fractional diameter in between these values.

In some embodiments, methods of the present invention can include applying a sizing solution to the nanoparticle-laden glass fibers. Sizing agents are coatings on fibers that can control many of the fibers' characteristics such as how the fibers will handle during processing and how the fibers perform as part of a composite. Fiber sizing agents have been developed to provide better interfacial strength when used in a composite, to improve lubricity to prevent fiber abrasion, and to provide antistatic properties, for example. Sizing agents can be any conventional sizing agent known in the art. The function of sizing agents include protecting the fiber from environmental conditions such as oxidative degradation, moisture, light, and the like. Included with most sizing agents or as a complementary sizing agent are pre-polymers and difunctional organic compounds to facilitate cross-polymerization with a given resin matrix. Any number of sizing agents can be used in combination and will depend on the end use of the fiber and the physical and or chemical properties of the fiber. Exemplary fiber sizing agents include, for example, silane-based sizing agents, modified polymers with silane chains, along with pre-polymers designed to create cross polymerization with particular resin matrices. For applications to glass fibers, in particular, sizing agents can include, alkoxysilanes, for example, and other reactive functional groups on other silicon-based backbone structures such as siloxanes. The exact choice of sizing agents are guided by the chemical nature of the glass fiber and matrix with which the fiber will interface. Other considerations include the particular application for the fiber and/or composite material and the environmental conditions that the fiber and/or composite will be exposed to, such as heat, moisture, and the like.

Sizing solutions of the present invention can include further ingredients such as surfactants, including non-ionic, zwitterionic, ionic surfactants. Ionic surfactants include cationic surfactants anionic surfactants. Sizing formulations also include solvents, such as water and/or conventional organic-based solvents. These solvents are generally employed to provide a means for evenly coating the elements of the sizing agent on the fiber. The solvent is typically removed in a curing step. In some embodiments, sizing solutions can be cured by heating the sized glass fiber to a temperature between about 100° C. to about 125° C.

While embodiments disclosed herein relate specifically to glass fibers, in some embodiments, the present invention also provides a method that includes incorporating a plurality transition metal nanoparticles in any fiber during fiber manufacture to provide a nanoparticle-laden fiber. The plurality of transition metal nanoparticles are embedded at the surface of the nanoparticle-laden fiber. Such nanoparticle-laden fibers can be further subjected the to conditions suitable for carbon nanotube growth, as described below.

In some embodiments, the fiber is carbon and the nanoparticles can be incorporated during graphitization. In some embodiments, the fiber is ceramic and the nanoparticles can be added during formation of the ceramic fiber. In some embodiments the fiber is an organic polymer, such as an aramid polymer. In yet further embodiments, the fiber is metal.

In some embodiments, the nanoparticle-laden glass fiber (or any other fiber type) can be further subject to conditions for synthesizing carbon nanotubes. This can be performed before or after applying and curing a sizing agent. The step of synthesizing carbon nanotubes can include numerous techniques for forming carbon nanotubes, including those disclosed in co-pending U.S. Patent Application No. US 2004/0245088 which is incorporated herein by reference. The CNTs grown on fibers of the present invention can be accomplished by techniques known in the art including, without limitation, micro-cavity, thermal or plasma-enhanced CVD techniques, laser ablation, arc discharge, and high pressure carbon monoxide (HiPCO). During CVD, in particular, a sized glass fiber material with CNT-forming catalyst disposed thereon, can be used directly. In some embodiments, any of the previously applied sizing agents can be removed during CNT synthesis. In other embodiments other sizing agents are not removed, but do not hinder CNT synthesis and infusion to the glass fiber material due to the diffusion of the carbon source through the sizing. In some embodiments, acetylene gas is ionized to create a jet of cold carbon plasma for CNT synthesis. The plasma is directed toward the catalyst-bearing glass fiber material. Thus, in some embodiments synthesizing CNTs on a glass fiber material includes (a) forming a carbon plasma; and (b) directing the carbon plasma onto the catalyst disposed on the glass fiber material. The diameters of the CNTs that are grown are dictated by the size of the CNT-forming catalyst as described above. In some embodiments, the sized fiber substrate is heated to between about 550 to about 800° C. to facilitate CNT synthesis. To initiate the growth of CNTs, two gases are bled into the reactor: a process gas such as argon, helium, or nitrogen, and a carbon-containing gas, such as acetylene, ethylene, ethanol or methane. CNTs grow at the sites of the CNT-forming catalyst.

In some embodiments, the CVD growth is plasma-enhanced. A plasma can be generated by providing an electric field during the growth process. CNTs grown under these conditions can follow the direction of the electric field. Thus, by adjusting the geometry of the reactor vertically aligned carbon nanotubes can be grown radially about a cylindrical fiber. In some embodiments, a plasma is not required for radial growth about the fiber. For glass fiber materials that have distinct sides such as tapes, mats, fabrics, plies, and the like, catalyst can be disposed on one or both sides and correspondingly, CNTs can be grown on one or both sides as well.

One configuration for continuous carbon nanotube synthesis involves a special rectangular reactor for the synthesis and growth of carbon nanotubes directly on glass fiber materials. The reactor can be designed for use in a continuous in-line process for producing carbon-nanotube bearing fibers. In some embodiments, CNTs are grown via a chemical vapor deposition ("CVD") process at atmospheric pressure and at elevated temperature in the range of about 550° C. to about 800° C. in a multi-zone reactor. The fact that the synthesis occurs at atmospheric pressure is one factor that facilitates the incorporation of the reactor into a continuous processing line for CNT-on-fiber synthesis. Another advantage consistent with in-line continuous processing using such a zone reactor is that CNT growth occurs in a seconds, as opposed to minutes (or longer) as in other procedures and apparatus configurations typical in the art.

CNT synthesis reactors in accordance with the various embodiments include the following features:

Rectangular Configured Synthesis Reactors: The cross section of a typical CNT synthesis reactor known in the art is circular. There are a number of reasons for this including, for example, historical reasons (cylindrical reactors are often used in laboratories) and convenience (flow dynamics are easy to model in cylindrical reactors, heater systems readily accept circular tubes (quartz, etc.), and ease of manufacturing. Departing from the cylindrical convention, the present invention provides a CNT synthesis reactor having a rectangular cross section. The reasons for the departure are as follows: 1. Since many glass fiber materials that can be processed by the reactor are relatively planar such as flat tape or sheet-like in form, a circular cross section is an inefficient use of the reactor volume. This inefficiency results in several drawbacks for cylindrical CNT synthesis reactors including, for example, a) maintaining a sufficient system purge; increased reactor volume requires increased gas flow rates to maintain the same level of gas purge. This results in a system that is inefficient for high volume production of CNTs in an open environment; b) increased carbon feedstock gas flow; the relative increase in inert gas flow, as per a) above, requires increased carbon feedstock gas flows. Consider that the volume of a 12K glass fiber roving is 2000 times less than the total volume of a synthesis reactor having a rectangular cross section. In an equivalent growth cylindrical reactor (i.e., a cylindrical reactor that has a width that accommodates the same planarized glass fiber material as the rectangular cross-section reactor), the volume of the glass fiber material is 17,500 times less than the volume of the chamber. Although gas deposition processes, such as CVD, are typically governed by pressure and temperature alone, volume has a significant impact on the efficiency of deposition. With a rectangular reactor there is a still excess volume. This excess volume facilitates unwanted reactions; yet a cylindrical reactor has about eight times that volume. Due to this greater opportunity for competing reactions to occur, the desired reactions effectively occur more slowly in a cylindrical reactor chamber. Such a slow down in CNT growth, is problematic for the development of a continuous process. One benefit of a rectangular reactor configuration is that the reactor volume can be decreased by using a small height for the rectangular chamber to make this volume ratio better and reactions more efficient. In some embodiments of the present invention, the total volume of a rectangular synthesis reactor is no more than about 3000 times greater than the total volume of a glass fiber material being passed through the synthesis reactor. In some further embodiments, the total volume of the rectangular synthesis reactor is no more than about 4000 times greater than the total volume of the glass fiber material being passed through the synthesis reactor. In some still further embodiments, the total volume of the rectangular synthesis reactor is less than about 10,000 times greater than the total volume of the glass fiber material being passed through the synthesis reactor. Additionally, it is notable that when using a cylindrical reactor, more carbon feedstock gas is required to provide the same flow percent as compared to reactors having a rectangular cross section. It should be appreciated that in some other embodiments, the synthesis reactor has a cross section that is described by polygonal forms that are not rectangular, but are relatively similar thereto and provide a similar reduction in reactor volume relative to a reactor having a circular cross section; c) problematic temperature distribution; when a relatively small-diameter reactor is used, the temperature gradient from the center of the chamber to the walls thereof is minimal. But with increased size, such as would be used for commercial-scale production, the temperature gradient increases. Such temperature gradients result in product quality variations across a glass fiber material substrate (i.e., product quality varies as a function of radial position). This problem is substantially avoided when using a reactor having a rectangular cross section. In particular, when a planar substrate is used, reactor height can be maintained constant as the size of the substrate scales upward. Temperature gradients between the top and bottom of the reactor are essentially negligible and, as a consequence, thermal issues and the product-quality variations that result are avoided. 2. Gas introduction: Because tubular furnaces are normally employed in the art, typical CNT synthesis reactors introduce gas at one end and draw it through the reactor to the other end. In some embodiments disclosed herein, gas can be introduced at the center of the reactor or within a target growth zone, symmetrically, either through the sides or through the top and bottom plates of the reactor. This improves the overall CNT growth rate because the incoming feedstock gas is continuously replenishing at the hottest portion of the system, which is where CNT growth is most active. This constant gas replenishment is an important aspect to the increased growth rate exhibited by the rectangular CNT reactors.

Zoning. Chambers that provide a relatively cool purge zone depend from both ends of the rectangular synthesis reactor. Applicants have determined that if hot gas were to mix with the external environment (i.e., outside of the reactor), there would be an increase in degradation of the glass fiber material. The cool purge zones provide a buffer between the internal system and external environments. Typical CNT synthesis reactor configurations known in the art typically require that the substrate is carefully (and slowly) cooled. The cool purge zone at the exit of the present rectangular CNT growth reactor achieves the cooling in a short period of time, as required for the continuous in-line processing.

Non-contact, hot-walled, metallic reactor. In some embodiments, a hot-walled reactor is made of metal is employed, in particular stainless steel. This may appear counterintuitive because metal, and stainless steel in particular, is more susceptible to carbon deposition (i.e., soot and by-product formation). Thus, most CNT reactor configurations use quartz reactors because there is less carbon deposited, quartz is easier to clean, and quartz facilitates sample observation. However, Applicants have observed that the increased soot and carbon deposition on stainless steel results in more consistent, faster, more efficient, and more stable CNT growth. Without being bound by theory it has been indicated that, in conjunction with atmospheric operation, the CVD process occurring in the reactor is diffusion limited. That is, the catalyst is "overfed;" too much carbon is available in the reactor system due to its relatively higher partial pressure (than if the reactor was operating under partial vacuum). As a consequence, in an open system—especially a clean one—too much carbon can adhere to catalyst particles, compromising their ability to synthesize CNTs. In some embodiments, the rectangular reactor is intentionally run when the reactor is "dirty," that is with soot deposited on the metallic reactor walls. Once carbon deposits to a monolayer on the walls of the reactor, carbon will readily deposit over itself. Since some of the available carbon is "withdrawn" due to this mechanism, the remaining carbon feedstock, in the form of radicals, react with the catalyst at a rate that does not poison the catalyst. Existing systems run "cleanly" which, if they were open for continuous processing, would produced a much lower yield of CNTs at reduced growth rates.

Although it is generally beneficial to perform CNT synthesis "dirty" as described above, certain portions of the apparatus, such as gas manifolds and inlets, can nonetheless negatively impact the CNT growth process when soot created blockages. In order to combat this problem, such areas of the CNT growth reaction chamber can be protected with soot inhibiting coatings such as silica, alumina, or MgO. In practice, these portions of the apparatus can be dip-coated in these soot inhibiting coatings. Metals such as INVAR® can be used with these coatings as INVAR has a similar CTE (coefficient of thermal expansion) ensuring proper adhesion of the coating at higher temperatures, preventing the soot from significantly building up in critical zones.

Combined Catalyst Reduction and CNT Synthesis. In the CNT synthesis reactor disclosed herein, both catalyst reduction and CNT growth occur within the reactor. This is significant because the reduction step cannot be accomplished timely enough for use in a continuous process if performed as a discrete operation. In a typical process known in the art, a reduction step typically takes 1-12 hours to perform. Both operations occur in a reactor in accordance with the present invention due, at least in part, to the fact that carbon feedstock gas is introduced at the center of the reactor, not the end as would be typical in the art using cylindrical reactors. The reduction process occurs as the fibers enter the heated zone; by this point, the gas has had time to react with the walls and cool off prior to reacting with the catalyst and causing the oxidation reduction (via hydrogen radical interactions). It is this transition region where the reduction occurs. At the hottest isothermal zone in the system, the CNT growth occurs, with the greatest growth rate occurring proximal to the gas inlets near the center of the reactor.

In some embodiments, the present invention provides a glass fiber that includes transition metal oxide nanoparticles disposed throughout the fiber, including nanoparticles exposed at the fiber surface. In some embodiments, the present invention provides glass fibers that includes transition metal oxide nanoparticles embedded only at the surface of the fiber. Transition metal oxides include, for example, iron oxide, copper oxide, cobalt oxide, and nickel oxide. Any of these glass fibers of can further include a sizing, and optionally, a further resin. These glass fibers can be wound on a spool or mandrel and packaged for sale as CNT synthesis ready glass fibers.

In some embodiments, a sized nanoparticle-laden fiber can be passed through a chopper gun. This can be done before or after curing a sizing agent. The chopped glass fibers can be used to form chopped strand mats and the like. After forming such mats, the mat can be exposed to conditions for CNT synthesis. In alternate embodiments, CNTs can be synthesized on the full length glass fiber materials and then the CNT-infused fiber material passed through a chopper gun. Chopped glass fibers having CNTs grown from the nanoparticle catalyst can be integrated with various resins to provide materials such a glass reinforced plastics (GRP) and other composite constructs. Exemplary composites include, without limitation, glass reinforced PEEK, epoxy, nylon, polycarbonate, concrete, gypsum, ceramics, and the like.

Any of the glass fiber materials of the invention having nanoparticles disposed throughout or only at the surface can be optionally used "as is" in a composite material. Moreover, any of the glass fiber materials can be further processed to synthesize CNTs prior to placing them within a composite structure. Composite structures include a matrix material and the glass fiber material. Matrix materials can be selected from an epoxy, a polyester, a vinylester, a polyetherimide, a polyetherketoneketone, a polyphthalamide, a polyetherketone, a polytheretherketone, a polyimide, a phenol-formaldehyde, and a bismaleimide.

Matrix materials useful in composites of the present invention can include any of the known matrix materials (see Mel M. Schwartz, Composite Materials Handbook (2d ed. 1992)). Matrix materials more generally can include resins (polymers), both thermosetting and thermoplastic, metals, ceramics, and cements.

Thermosetting resins useful as matrix materials include phthalic/maelic type polyesters, vinyl esters, epoxies, phenolics, cyanates, bismaleimides, and nadic end-capped polyimides (e.g., PMR-15). Thermoplastic resins include polysulfones, polyamides, polycarbonates, polyphenylene oxides, polysulfides, polyether ether ketones, polyether sulfones, polyamide-imides, polyetherimides, polyimides, polyarylates, and liquid crystalline polyester.

Metals useful as matrix materials include alloys of aluminum such as aluminum 6061, 2024, and 713 aluminum braze. Ceramics useful as matrix materials include glass ceramics, such as lithium aluminosilicate, oxides such as alumina and mullite, nitrides such as silicon nitride, and carbides such as silicon carbide. Cements useful as matrix materials include carbide-base cements (tungsten carbide, chromium carbide, and titanium carbide), refractory cements (tungsten-thoria and barium-carbonate-nickel), chromium-alumina, nickel-magnesia iron-zirconium carbide. Any of the above-described matrix materials can be used alone or in combination.

When using CNT-infused glass fibers, the CNTs provide sizing-like properties, but are more robust than conventional sizing materials and the CNTs can improve the fiber-to-matrix interface in composite materials and, more generally, improve fiber-to-fiber interfaces. Indeed, CNT-infused glass fiber materials are themselves composite materials in the sense the CNT-infused glass fiber material properties will be a combination of those of the glass fiber material as well as those of the infused CNTs. Consequently, embodiments of the present invention provide a means to impart desired properties to a glass fiber material that otherwise lack such properties or possesses them in insufficient measure. Glass fiber materials can be tailored or engineered to meet the requirements of specific applications. The CNTs acting as sizing can protect glass fiber materials from absorbing moisture due to the hydrophobic CNT structure. Moreover, hydrophobic matrix materials interact well with hydrophobic CNTs to provide improved fiber to matrix interactions.

It is understood that modifications which do not substantially affect the activity of the various embodiments of this invention are also included within the definition of the invention provided herein. Accordingly, the following examples are intended to illustrate but not limit the present invention.

EXAMPLE I

This example demonstrates the incorporation of iron nanoparticles on the surface of a nascent s-glass fiber via the cooling fluid post-extrusion.

Nanoparticles are incorporated on the surface of nascent fibers using a furnace apparatus 100 for the manufacture of glass fibers. Raw materials 110 are fed into furnace apparatus 100 which includes a three-sectioned chamber housing a main melting furnace section 120, a refining section 130, and forehearth 140. Glass fiber is made by blending raw materials 110, melting them in this three-stage furnace, extruding the molten glass through bushings 150 in the bottom of forehearth 140, cooling the filaments using a water-based nanoparticle solution (between 150 & 160), and then applying a chemical size to prevent abrasion and other damage to the fibers (between 150 & 160). The nanoparticle-infused filaments then are gathered and wound into a package on winders 160.

In furnace apparatus 100, the melting furnace section 120 receives raw materials 110 which are a mixture of glass components. In the case of S-Glass, the raw materials consist of 64-66% silicon dioxide, 0-0.3% calcium oxide, 24-26% aluminum oxide, 0-0.3% sodium & potassium oxide, 9-11% magnesium oxide, and 0-0.3% iron oxide.

In melting furnace section 120, melting occurs at temperatures between 1600-1700° C. in this first section and uniformity is increased, including removal of bubbles. The molten glass then flows into refiner 130, where its temperature is reduced to 1400-1500° C. and well mixed glass is isolated for glass fiber formation. Finally the molten glass is delivered to forehearth 140, beneath which is located a series of bushings 150 that are used to extrude the molten glass into fibers.

Formation of the glass fiber includes a combination of extrusion and attenuation. Extrusion occurs as the molten glass passes out of forehearth 140 through bushing 150 made of an erosion-resistant platinum/rhodium alloy with 5,000 very fine orifices.

Bushing 150 is heated electronically, and its temperature (about 1150° C.) is precisely controlled to maintain a constant glass viscosity. Attenuation then occurs as the extruded streams of molten glass of a specific viscosity are mechanically drawing into filaments. In this case, the resulting filament diameter is about 10 μm when drawn at 100 ft/min.

Water jets are employed to cool the filaments as they exit bushing 150 and prior to winders 160. In this example, nanoparticles are delivered to the glass fibers as part of the cooling water system. Cationic iron oxide nanoparticles between 4-20 nm in diameter (Ferrotec) are suspended in the cooling water solution at concentrations of 1 part catalyst solution to 200 parts deionized water. The nanoparticles solution is exposed to the surface of the fiber via the cooling spray. The fiber temperature is reduced from over 800° C. to below 200° C.

The resulting glass structure effectively locks in the nanoparticle with a high degree of conformal contact between the fiber and the nanoparticle by mechanical bonding. The resulting nanoparticle-infused glass contains approximately 0.1-0.5% nanoparticles by linear weight.

The nanoparticle-laden glass fiber is immediately passed through a sizing station prior to winders 160 and after applying the nanoparticles simultaneously with the cooling water. Sizing consists of a silane-based coating of 0.3% volume sizing in water and is used to reduce handling-based damage, improve product packaging, and enhance future fiber to matrix wettability and adhesion.

Winders 160 are used to provide the attenuation of the molten streams. Because winders 160 revolve at a circumferential speed faster than the molten glass exiting bushing 150, tension is applied, drawing the glass into thin filaments (10 μm when drawn at 100 ft/min).

Further curing of the size is utilized to provide additional chemical bonding between the sizing and the glass surface. Post curing of the nanoparticle-infused glass product occurs at temperatures of between 100-120° C. and take place for a duration of 24 hours to ensure all excess water is removed from the product. The curing step promotes interactions between hydroxyl groups of the silica in the glass and the silane groups in the sizing the improve adhesion by providing a boding motif between the sizing and the glass surface.

The resulting nanoparticle-infused S-glass fiber provides nanoparticles embedded in the glass fiber with continual conformal contact and no additional roughening/etching of the glass fiber surface is needed. The result is a nanoparticle-laden catalyst with improved structural integrity, which can be used for in situ growth of carbon nanotubes on the glass fiber surface using an in-line CNT growth process.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other processes, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A glass fiber comprising transition metal oxide nanoparticles disposed throughout the glass fiber, the transition metal oxide nanoparticles comprising about 0.01 to about 5 percent of the glass fiber by weight and having a protective coating thereon that comprises porous alumina or a porous ceramic.

2. The glass fiber of claim 1, wherein the transition metal oxide comprises an oxide selected from the group consisting of iron, copper, nickel, cobalt, and mixtures thereof.

3. The glass fiber of claim 1, wherein the transition metal oxide nanoparticles range in size from between about 0.1 to about 80 nm.

4. The glass fiber of claim 1, wherein the transition metal oxide nanoparticles range in size from between about 5 nm to about 30 nm.

5. A chopped strand mat comprising the glass fiber of claim 1.

6. A composite comprising the glass fiber of claim 1.

7. A glass fiber comprising transition metal oxide nanoparticles embedded at the surface of the glass fiber such that the transition metal oxide nanoparticles are at least partially within a. structure of the glass fiber, the transition metal oxide nanoparticles comprising about 0.001 to about 3 percent of the glass fiber by weight and having a protective coating thereon that comprises porous alumina or a porous ceramic.

8. The glass fiber of claim 7, wherein the transition metal oxide comprises an oxide selected from the group consisting of iron, copper, nickel, cobalt, and mixtures thereof.

9. The glass fiber of claim 7, wherein the transition metal oxide nanoparticles range in size from between about 0.1 nm to about 80 nm.

10. The glass fiber of claim 7, wherein the transition metal oxide nanopartic es range in size from between about 5 nm to about 30 nm.

11. A chopped strand mat comprising the glass fiber of claim 7.

12. A composite comprising the glass fiber of claim 7.

* * * * *